(12) United States Patent
Okamoto

(10) Patent No.: US 6,345,067 B1
(45) Date of Patent: Feb. 5, 2002

(54) CLOCK REGENERATING CIRCUIT IN DIRECT SPREAD SPECTRUM COMMUNICATION SYSTEM

(75) Inventor: Naoki Okamoto, Chiba (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/110,438

(22) Filed: Jul. 6, 1998

(30) Foreign Application Priority Data

Sep. 22, 1997 (JP) .............................. 9-256396

(51) Int. Cl.⁷ .............................................. H04B 1/707
(52) U.S. Cl. ...................................... 375/140; 375/147
(58) Field of Search .............................. 375/140, 142, 375/147, 355

(56) References Cited

U.S. PATENT DOCUMENTS 5,128,957 A * 7/1992 Nakagawa .................. 375/142
6,047,033 A * 4/2000 Chen .......................... 375/326

FOREIGN PATENT DOCUMENTS

| JP | 8 316875 | 11/1996 |
| JP | 955714 | 2/1997 |
| JP | 9 270735 | 10/1997 |
| JP | 9 298491 | 11/1997 |

* cited by examiner

Primary Examiner—Chi Pham
Assistant Examiner—Kevin M Burd

(57) ABSTRACT

A clock regenerating circuit is capable of stably generating a correct regenerated clock operated based upon a correlation signal output also in a system for multiplexing plural series of signals in which a signal which is spread with a spreading code is delayed each other by optional several chips. Only a portion of a correlation signal having a correlation peak is sequentially extended on a time axis, and is compared with a threshold value which is given from a terminal in comparators. The resultants of comparison are added to each other in adders to specify a position where an overflow occurred (the position representing advance or lag of the clock). Switching of the frequency dividing circuit is conducted in a clock regenerating unit in response to the output so that a clock which is in a correct timing relation is reproduced. In case of delay multiplexing, each component is controlled to lower the threshold value, to increase overflow, and narrow the time window with the increase in the multiplexing number, to provide an optimal condition.

9 Claims, 14 Drawing Sheets

FIG.3
( PRIOR ART )
(A)
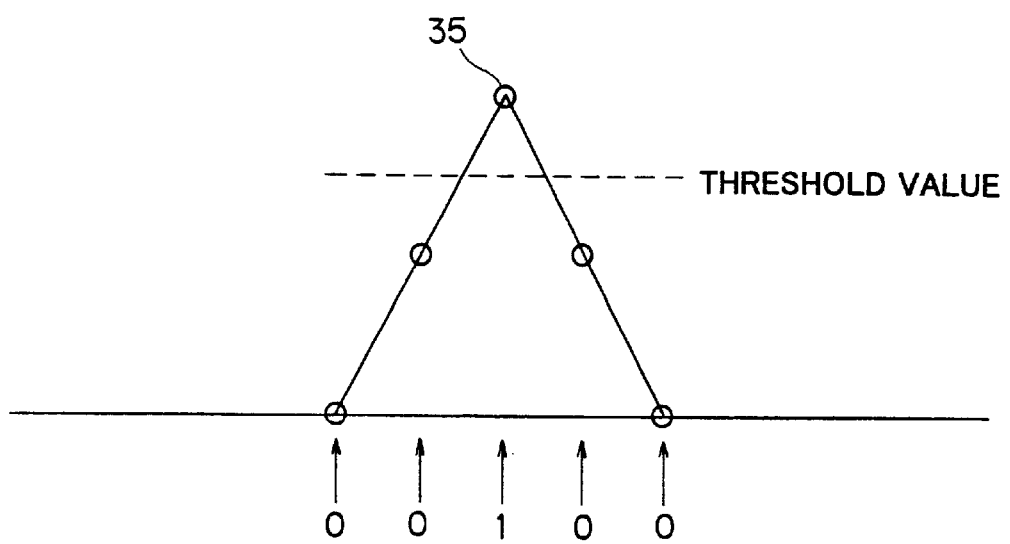
(B)
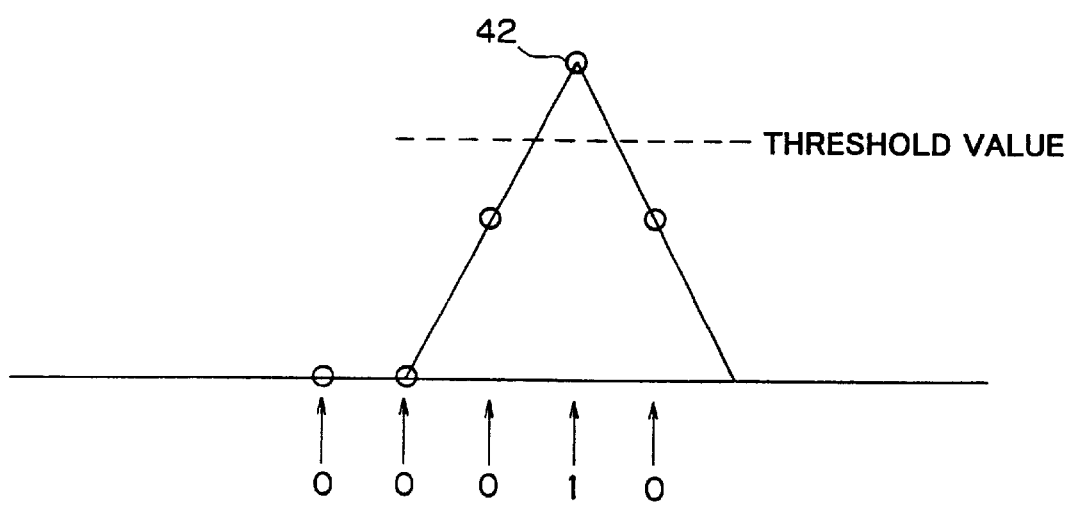

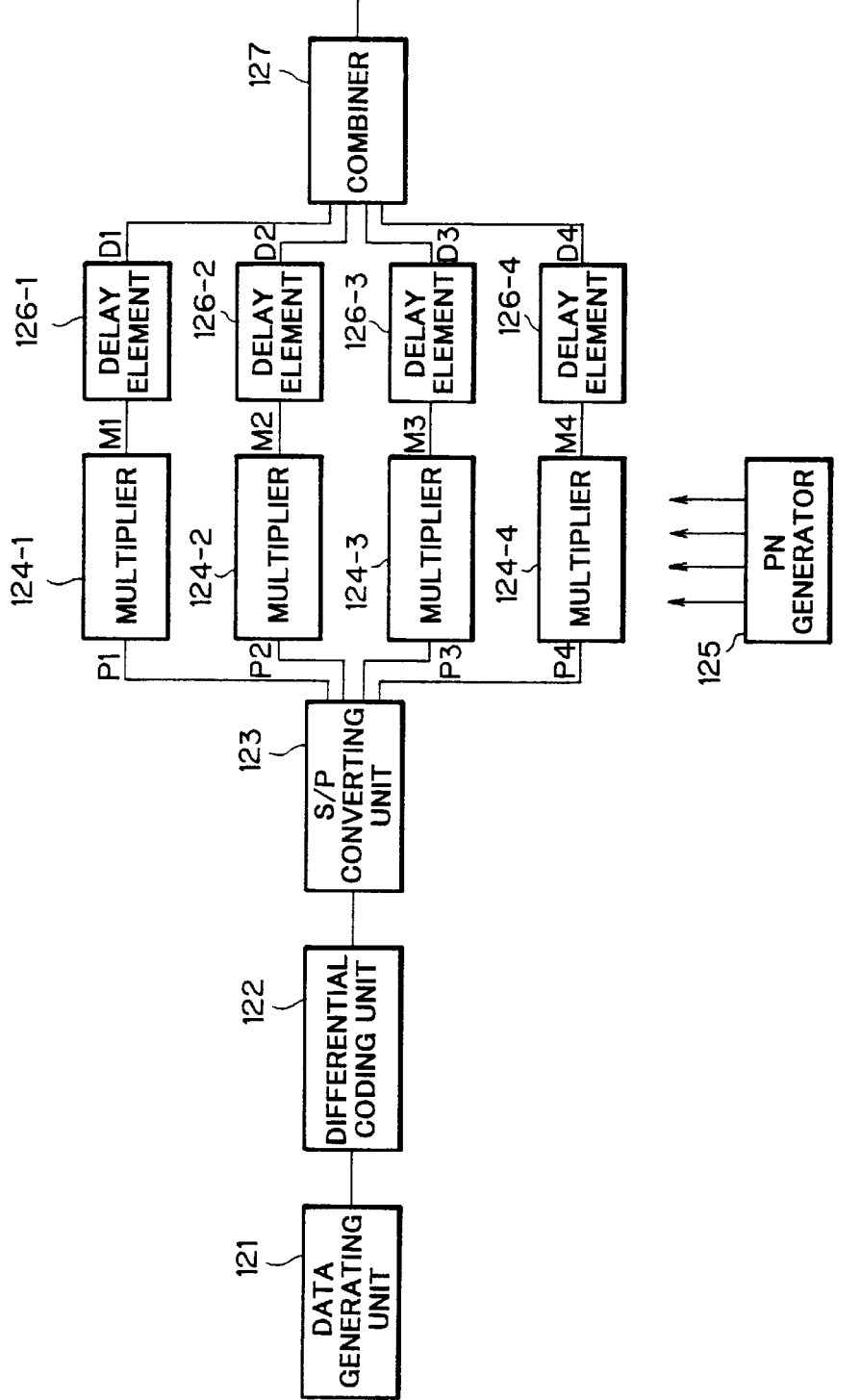

FIG.11
(A)
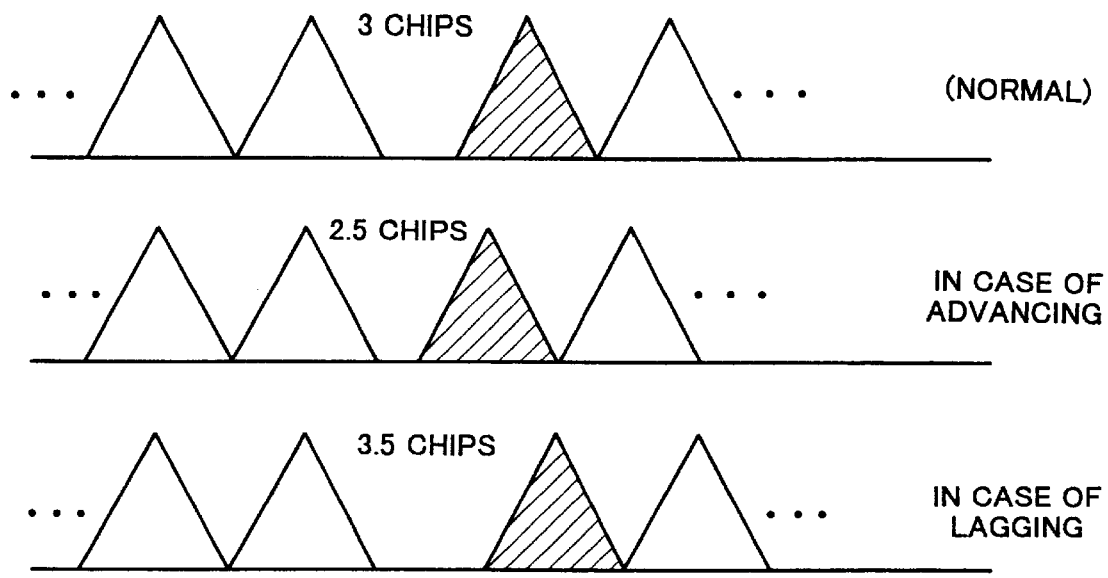
(B)
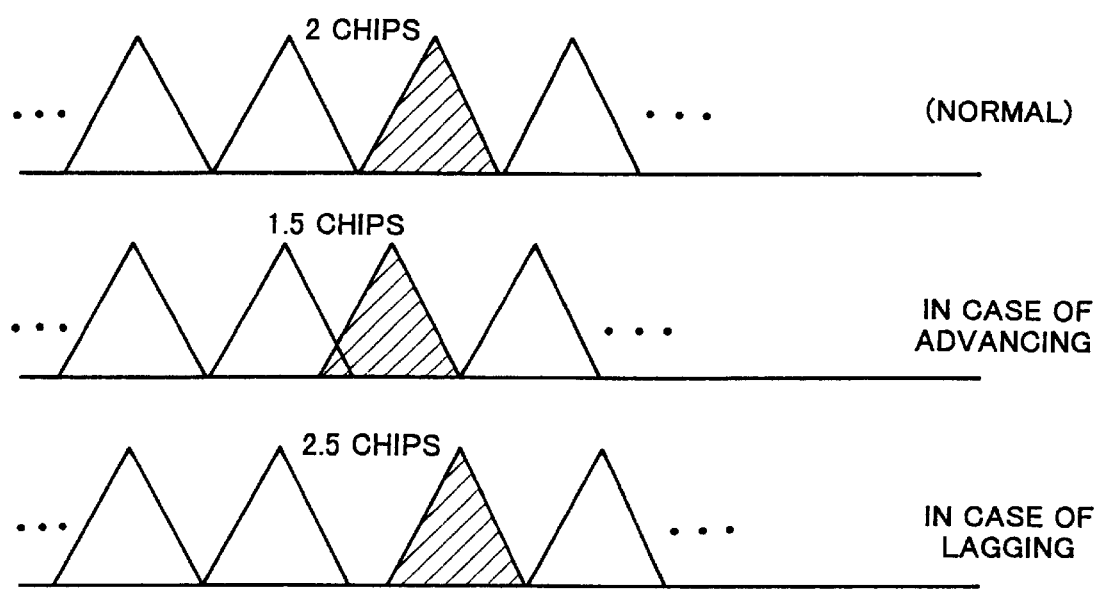

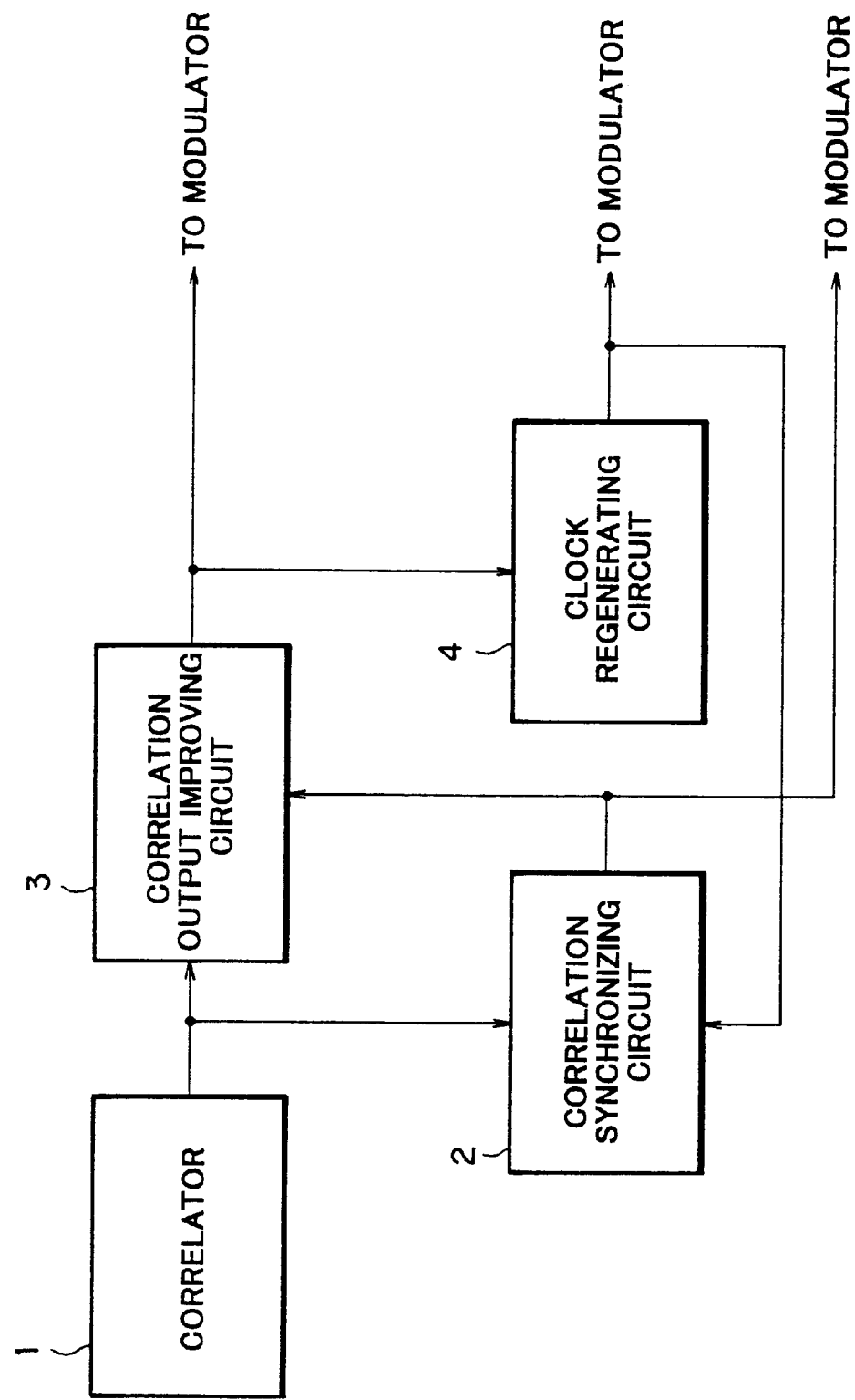

CLOCK REGENERATING CIRCUIT IN DIRECT SPREAD SPECTRUM COMMUNICATION SYSTEM

BACKGROUND OF THE INVENTION

The present invention relates to a spread spectrum communication system, and in particular to a communication clock regenerating circuit using a direct spread passive type correlator.

In conventional data communications, communication schemes using a narrow band modulating system have been practically used. In these schemes, demodulation in a receiver can be implemented by a relatively compact circuit. However, it is susceptible to multi-path or narrow band non-white noise, which may occur in indoor environments such as offices or factories.

In contrast to this, the spread spectrum communication system has an advantage in that it can overcome the above-mentioned problems since a signal for carrying data thereon is transmitted in a wide band so that the spectrum of the signal to be transmitted is spread with a spread code when the signal is transmitted.

In such a system, a clock regenerating circuit is necessary to provide in a receiver a clock which is synchronized with the operation clock in a transmitter since both the transmitter and receiver are independently operated in response to different clocks. Such a clock regenerating circuit has conventionally comprised analog circuits, such as filtering circuits, VCO and shaping circuits. Since it is difficult to integrate analog circuits, resulting in problems with the circuit scale becoming larger and problems in circuit mounting due to coexistence of digital and analog circuits.

Hence, the inventor of the present application has invented a clock regenerating circuit which is formed of only digital circuits (refer to Japanese Laid-Open Patent Publication (TOKKAIHEI) No. 8-316875).

An example of this invention is shown in FIGS. 1 to 3. FIG. 1 is a block diagram showing a circuit of the clock regenerating circuit, and FIG. 2 is block diagram showing clock regenerating circuit in FIG. 1 in more detail.

As shown in FIG. 1, a correlation signal which is obtained from a correlator (not shown) is extended along a time axis by delay elements 110-1 to 110-5 (for example, shift registers). At this time, sampling is conducted on a basis of two samples per chip.

The clock regeneration is carried out by a sync pulse, a window control unit 111 which is controlled by the sync pulse and a correlation signal for several samples which are gated by the window control unit 111 before and after the window.

The regenerating clock is generated based upon the sync pulse of a correlation sync circuit (not shown). An offset in time between the clocks of the transmitter and the receiver is compensated for by means of a tracking circuit using the window. The correlation signal within a window (time window) is compared with a threshold value which is preset for each sample in comparators 112-1 to 112-5 so that it is output as a signal of "1" or "0".

Thereafter, the output signals are added by means of adders 113-1 to 113-5. A clock regenerating unit 115 is adapted to control the regenerating clock in the clock regenerating unit 115 in response to overflow signals from the adders if any.

FIG. 2 shows the details of the clock regenerating unit shown in FIG. 1. In the clock regenerating unit 115, the frequency of a sampling clock which is generated by a sync pulse generating circuit 115g and is used for despreading is divided by 2×k by means of a 2×k (k denotes the length of a spreading code) frequency divider 115d-2 so that a data clock is generated. However, it is necessary to control the data clock since there is a clock offset in time between the transmitter and the receiver.

A method of controlling the clock will be described by way of a prior art with reference to FIG. 2. If the adder 113-3 for the central timing in the window overflows first in an advance and lag control signal forming circuit 114 (refer to FIG. 1), the clock regenerating unit 115 maintains the current timing. If an adder corresponding to early timing overflows first, the timing of the clock regenerating unit 115 is delayed by one sample (clock from a (2×k−1) frequency divider 115d-1 is selected). If the later timing adder overflows first, the timing of the clock regenerating unit 115 is advanced by one sample (the clock from the (2×k+1) frequency divider 115d-3 is selected). Tracking of the regenerating clock has been conventionally conducted in such a manner.

The relation of a correlation signal with respect to the regenerating clock timing in such operation is shown in FIG. 3. FIG. 3A shows the synchronized timing relation. The current clock regenerating circuit is in a synchronization relationship with timing point 35. In this case, timing point 35 occurs only when an ideal correlation signal exceeds a threshold. As a result, only adder 113-3 counts up in FIG. 1.

Also in this case, a correlation signal may be deformed due to the influence of noise components. On an average, the adder 113-3 will count the most so that it overflows first. As a result, the clock regenerating timing determines that the timing relationship is correct and maintains its timing.

On the other hand, FIG. 3B shows the unsynchronized relationship. In this case, since the regenerated clock is delayed, the peak of the correlation signal is shifted by one period to the timing point 42. As a result, the correlation signal exceeds the threshold at only the shifted timing point. As the result of this, only the adder 113-4 counts up by one.

Also in this case, the correlation signal may be deformed due to noise components. On an average, the adder 113-4 will count the most so that it overflows first. In this case, it is determined that the clock timing is late, so that it is advanced by one sample (a clock from the (2×k+1) frequency divider 115d-3 is selected). Thus, the clock timing is shifted to timing point 35 so that correct clock timing is provided.

In such a conventional manner, the clock timing relationship is controlled so that the clock regeneration is achieved in the central position of the correlation. If, for example, the clock timing is offset between the transmitter and the receiver, an advancing operation is conducted every ½×k× 100 seconds. Using the sampling timing for despreading the spread signal enables the clock regeneration to be digitally conducted.

The above-mentioned prior art (specification of Japanese Laid-Open Patent Publication (TOKKAIHEI) No. 8-316875 mentions a time window, weighting and threshold which is used for controlling the clock timing.

The inventor of the present application proposed a multiplexing system in spread spectrum technology in Japanese Laid-Open Patent Publication (TOKKAIHEI) No. 9-55714. Configuration of a transmitter system in the multiplexing system will be described with reference to FIGS. 4A and 4B.

A data signal from a data generator 121 is differentially encoded by means of a differential encoder 122 and is converted into four parallel signals P1 through P4 by means of a serial/parallel converter 123. The parallel signals P1 through P4 are multiplied by a spread code from a PN generator 125 by means of multipliers 124-1 through 124-4 so that they become independent spread signals M1 to M4. The spread signals are differently delayed by the delay elements 126-1 through 126-4, and then combined with each other in a combiner 127.The combined signal is modulated with a synthesized signal in a multi-value modulator 128 having an oscillator 129, and is frequency-converted by a frequency converter 130, and is then transmitted after it has been amplified by a power amplifier 131. This causes a number of serial/parallel converted signals to be multiplexed and to be transmitted. Although conversion into four parallel signals is conducted in FIG. 4, the number of the converted parallel signals may be optionally determined on presetting of the multiplexing number.

A case in which the signal which has been transmitted in such a manner is received and is passed through a correlator (not shown) will be considered.

Since a multiplexed signal is a sum of independent signals, an output of the correlator is also a linear sum of outputs when respective signals are passed through the correlator. This example is shown in FIG. 5.

An example of the multiplexing of 5 signals is shown in FIG. 5 which is unlike the multiplexing of four signals of FIGS. 4A and 4B. A Barker code of 11 chips is used as the spread code.

In this case, the amount of delay for multiplexing of 5 signals is 11/5, by which the signals are equally spaced. It is difficult to equally space the signals in a digital circuit. The signals are usually spaced by a multiple of the integer number of chips. The signals will be delayed by 2, 2, 2, 2 and 3 chips.

Delaying by a multiple of the integer number of chips is readily applicable to a case in which the invention of the Japanese Laid-open Patent Publication (TOKKAIHEI) No. 9-270735 which was invented by the inventor of this application is embodied.

The correlation which is shown in FIG. 5F is a sum of the outputs of the 5 multiplexed signals, each of which is shown in parts (A) through (E) of FIG. 5. $(I^2+Q)^{1/2}$, that is, a root of the sum of squares of the correlation outputs is used for clock regeneration when the correlation outputs provide an absolute value of correlation signals, or I and Q signals.

If the signals are not multiplexed, the root of the sum of squares of the correlation outputs all assume 11. Accordingly, the clock regeneration characteristics would be suitably satisfied by means of the prior art clock regenerating circuit, if the threshold value is preset to about 8.

However, if the signals are multiplexed in a manner as mentioned in the foregoing example, the root of sum of squares of the correlation outputs would vary in a range from 7 to 15. The clock regeneration characteristics may not be sufficiently satisfied by the prior art configuration.

SUMMARY OF THE INVENTION

The present invention was made to overcome the above-mentioned problems in the prior art clock regenerating circuit. It is an object of the present invention to provide a clock regenerating circuit which is capable of stably regenerating correct clock based upon the outputs of the correlation signals, even in a scheme in which signals which are spread with a spread code are multiplexed into a plural series of signals which are delayed by several chips.

(1) The present invention resides in a clock regenerating circuit in a direct spread spectrum communication system for regenerating a clock signal for sampling a spread signal which is directly spread with a spread code so that a predetermined number of samples are sampled per each chip. The present invention includes means for dividing the frequency of the clock to output a variable clock having a different frequency responsive to a control signal from a clock which is in synchronization with a demodulation and correlation synchronizing pulse. A plurality of comparators compare a predetermined threshold value with delayed correlation signals extended along a time axis which are obtained by conducting correlation processing of said spread signal which is sampled according to said sampling clock. The present invention further includes means for forming an advance/lag control signal by determining whether the timing of said sampling is advanced or lagged based upon each comparison resultant of the plurality of comparators. A variable clock is output by using an advance and lag control signal from said advance/lag control signal forming means as a control signal for said clock frequency dividing means. The clock regenerating circuit further includes weighting means for weighting each output of the plurality of comparators (not shown), and time window presetting means for presetting a window for each output of the plurality of comparators, whereby the threshold value in each comparator, the weight in said weighting means, and the time window in said time window presetting means is variable.

(2) The present invention is further characterized in that when used in a multiplexing system in which plural series of signals are directly spread with a spread code, each of which is delayed by one or more optional chips and can be multiplexed, said variably preset threshold value, weight and time window are determined on the basis of the multiplexing number/delay time of the multiplexing system.

(3) The present invention is still further characterized in that when said multiplex enabling system is operated in accordance with a scheme in which a transmission signal has a non-multiplexed field and multiplexed field, said circuit includes means for changing presetting of said threshold value, weight and time window at a transition between said non-multiplexed field and multiplexed field.

(4) The present invention is still further characterized in that said presetting changing means performs said changing operation in accordance with an intended data format of said transmission signal.

(5) The present invention is still further characterized in that said presetting changing means performs said changing operation in accordance with a changing timing data which is obtained from a signal demodulated from said transmission signal.

(6) The present invention is still further characterized in that said presetting changing means performs said changing operation in response to an external signal.

(7) The present invention includes a clock regenerating circuit in a direct spread spectrum communication system for regenerating a clock signal for sampling a spread signal which is directly spread with a spread code so that a predetermined number of samples are obtained per each chip. This includes means for dividing the frequency of the clock to output a variable clock having a different frequency responsive to a control signal from a clock which is in synchronization with a demodulation and correlation synchronizing pulse. A plurality of comparators compare a predetermined threshold value with delayed correlation signals extended along a time axis which are obtained by conducting correlation processing of said spread signal which is sampled according to said sampling clock. The present invention further includes means for forming an advance/lag control signal by determining whether the timing of said sampling is advanced or lagged based upon each comparison resultant of the plurality of comparators. A variable clock is output by using an advance and lag control signal from said advance/lag control signal forming means as a control signal for said clock frequency dividing means. When used in a system in which plural series of signals are directly spread with a spread code, each of which is delayed by several optional chips, and which can be multiplexed, regenerating the clock is also performed with reference to only a leading signal of a multiplexed block in a multiplexed field.

(8) The present invention includes a clock regenerating circuit in a direct spread spectrum communication system for regenerating a clock signal for sampling a spread signal which is directly spread with a spread code so that a predetermined number of samples are obtained per each chip. The present invention includes means for dividing the frequency of the clock to output a variable clock having a different frequency responsive to a control signal, from a clock which is in synchronization with a demodulation and correlation synchronizing pulse. A plurality of comparators compare a predetermined threshold value with delayed correlation signals extended along a time axis which are obtained by conducting correlation processing of said spread signal which is sampled according to said sampling clock. The present invention further includes means for forming an advance/lag control signal by determining whether the timing of said sampling is advanced or lagged based upon each comparison resultant of the plurality of comparators. A variable clock is output by using an advance and lag control signal from said advance/lag control signal forming means as a control signal for said clock frequency dividing means. When used in a system in which plural series of signals are directly spread with a spread code, each of which is delayed by several optional chips and which can be multiplexed, and wherein the preset delay time is non-uniform, operational timing of the regenerating clock with said variable clock is performed where the delay time is a longest delay of the preset delay time.

(9) The present invention is further characterized in that regeneration of a clock is performed where the presettable multiplex number is a largest value and the delay time is longer, and is also performed where the multiplex number is less than the largest value.

(10) The present invention includes a clock regenerating circuit in a direct spread spectrum communication system for regenerating a clock signal for sampling a spread signal which is directly spread with a spread code so that a predetermined number of samples are obtained per each chip. The present invention includes means for dividing the frequency of the clock to output a variable clock having a different frequency responsive to a control signal from a clock which is in synchronization with a demodulation and correlation synchronizing pulse. A plurality of comparators compare a predetermined threshold value with delayed correlation signals extended along a time axis which are obtained by conducting correlation processing of said spread signal which is sampled according to said sampling clock. The present invention further includes means for forming an advance/lag control signal by determining whether the timing of said sampling is advanced or lagged based upon each comparison resultant of the plurality of comparators. A variable clock is output by using an advance and lag control signal from said advance/lag control signal forming means as a control signal for said clock frequency dividing means. When used in a system in which plural series of signals are directly spread with a spread code, each of which is delayed by several optional chips and which can be multiplexed, a correlation output which has been subject to an improvement processing by an autocorrelation is input to the plurality of comparators to be compared with the threshold value in a multiplexed field.

BRIEF DESCRIPTION OF THE DRAWINGS

FIG. 3 is a correlation output view which is used for explaining the operation of the prior art clock regenerating circuits shown in FIGS. 1 and 2, parts (A) and (B) of FIG. 3 showing normal and lagged condition, respectively.

FIG. 4 shows the correct alignment of the drawing sheets for FIGS. 4A and 4B.

FIGS. 4A and 4B are a circuit block diagram showing a transmission device in a relay multiplexed communication system in prior art spread spectrum communication.

FIG. 11 is a schematic view of correlation outputs, which is used for explaining a case control operation of the clock regenerating circuit of the present invention is conducted in two states.

FIG. 14 is a circuit block diagram showing a further embodiment of the clock regenerating circuit of the present invention in the spread spectrum communication.

PREFERRED EMBODIMENT OF THE INVENTION

An embodiment of the present invention will be described with reference to FIGS. 6 and 7.

Figure 1:
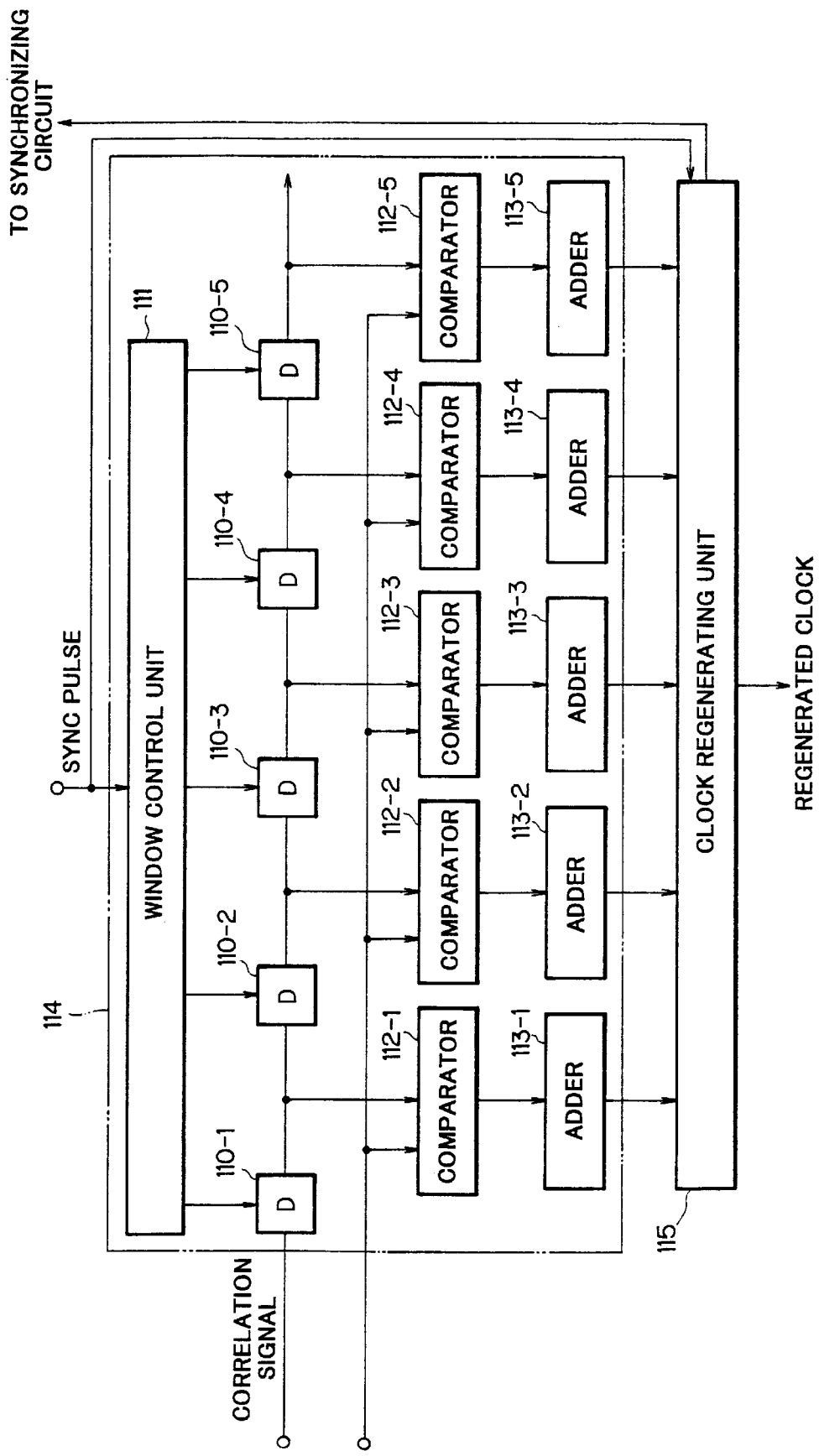
FIG. 1 is a circuit block diagram exemplarily illustrating a prior art clock regenerating circuit and for showing an advance and lag control signal forming circuit in more detail.
Figure 6:
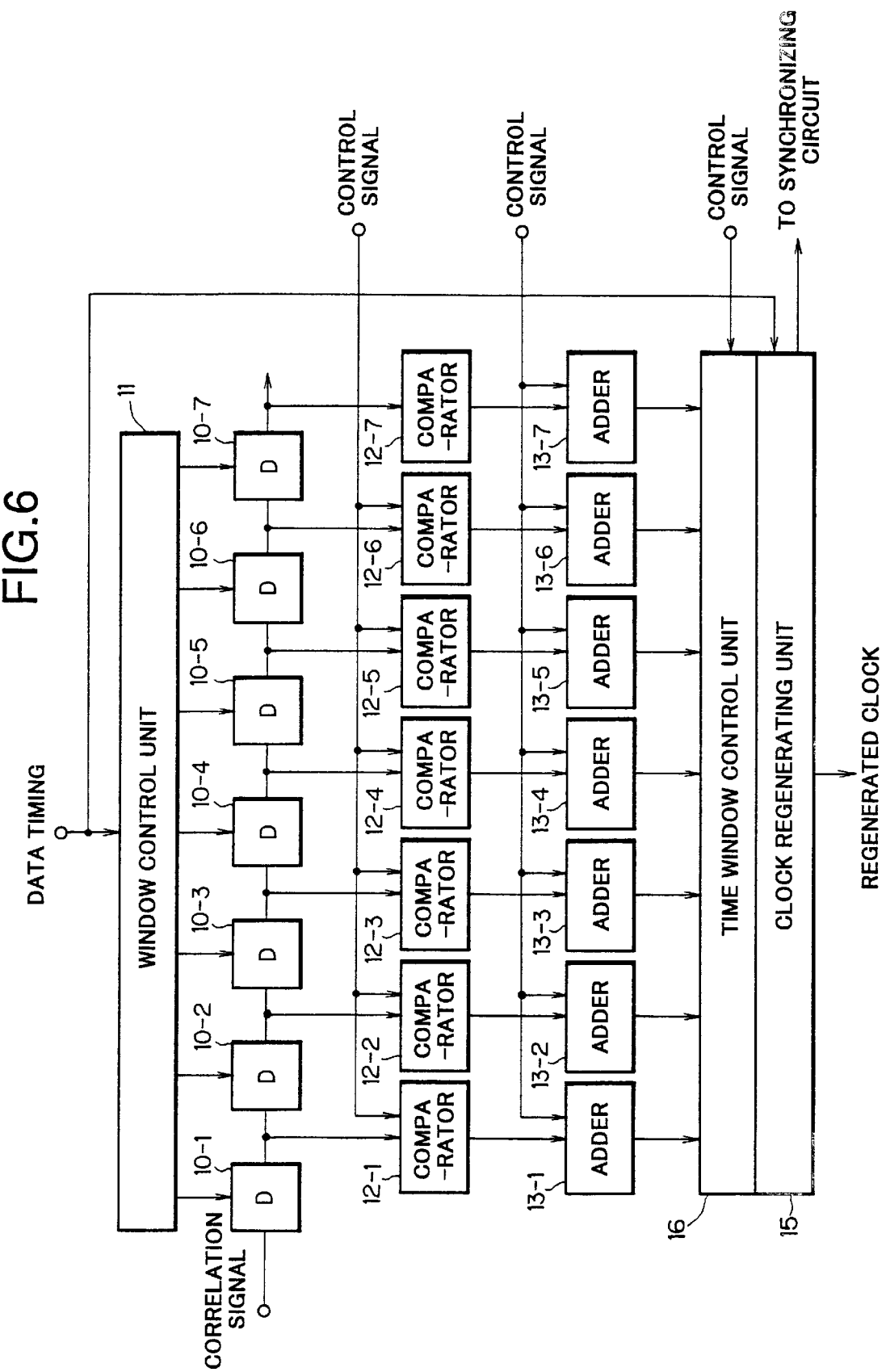
FIG. 6 is a circuit block diagram showing one embodiment of the clock regenerating circuit of the present invention in the spread spectrum communication.

FIG. 6 shows a clock regenerating circuit of the present invention which is similar to the clock regenerating circuit which is shown as a prior art in FIG. 1.

The number of shift registers 10-1 to 10-7 corresponds to 7 clock cycles. Since the number of shift registers is not limited to correspond to 5 clock cycles as in FIG. 1, extending along the principle time axis by means of the shift registers 10-1 to 10-7, operation of comparators 12-1 to 12-7 for comparing the signals with a threshold, and adders for adding the results of comparison is similar to that in the prior art. Sampling is also conducted on a basis of two samples per chip.

Figure 7:
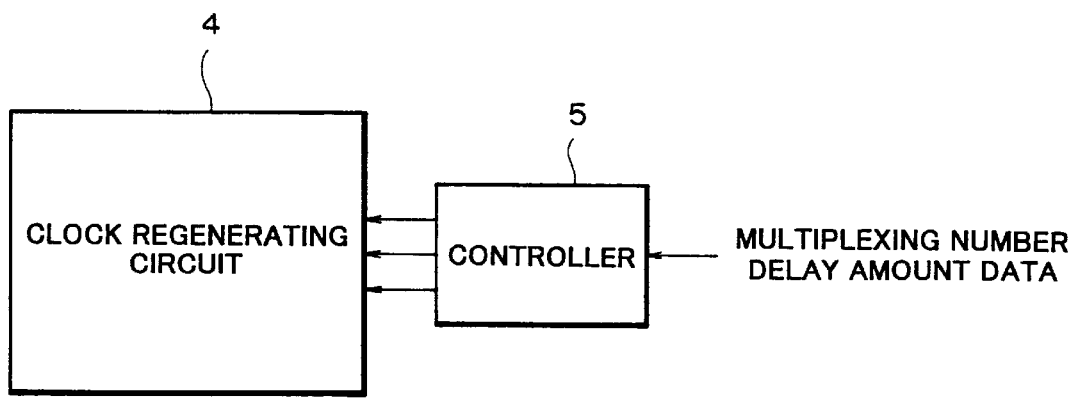
FIG. 7 is a circuit diagram showing a circuit including a controller in the embodiment of the clock regenerating circuit of the present invention.

In the present invention, a controller 5 for controlling a clock regenerating circuit 4 is provided as shown in FIG. 7 to output control signals for controlling threshold values of the comparator 12-1 to 12-7, overflow values of the adders 13-1 to 13-7 and the size of a window of a time window control unit 16, which is used for clock regeneration based upon the multiplexing number and the delay amount.

Thus, the comparators 12-1 to 12-7, adders 13-1 to 13-7, and time window control unit 16 are capable of changing the threshold values, overflow values and the size of a window, respectively in response to the control signals. In this embodiment, the time window can be narrowed from a maximum corresponding to 7 clock cycles. The values to be controlled can be adjusted to optimal Values depending upon a multiplexing number.

Example of optimal values are shown. When a Barker code 11 chips is used similarly to prior art for multiplexing the correlation outputs, which are assumed as a result of multiplexing, depend upon the multiplexing munber as follows:

| Multiplexing Number | Correlation Output |
|---|---|
| 1 | 11 |
| 2 | 10, 12 |
| 3 | 9, 11, 13 |
| 4 | 8, 10, 12, 14 |
| 5 | 7, 9, 11, 13, 15 |

Although the average value of the correlation outputs over a sufficiently extended period of time converges to 11, it varies for a comparatively short period of time.

An approach to this problem can be envisaged as follows:

1. A threshold value is slightly lowered as the multiplexing number increases.

2. A preset value at which the adders overflow is increased so that the integrated value is increased. A combination of approaches 1 and 2 is implemented in the control unit. The optimal values are preliminarily determined for each of applications based upon calculations and experiments, and stored in the controller. Optimal control is made possible by using the stored values.

Figure 5:
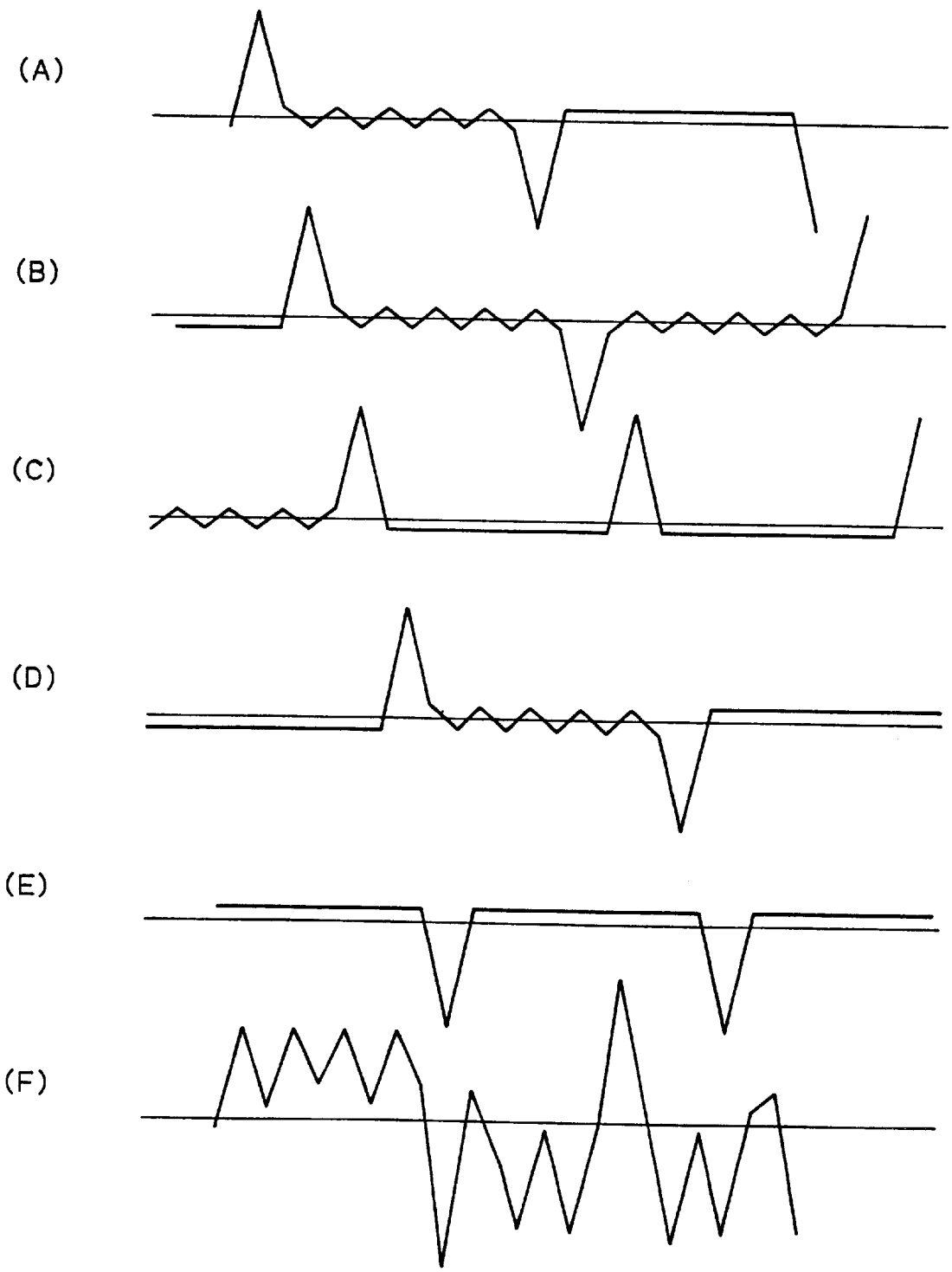
FIG. 5 is a correlation output view which is used for explaining the operation of the relay multiplexed communication system in prior art spread spectrum communication, part of (F) of FIG. 5 being a view showing a resultant output of those in parts of (A) through (E) of FIG. 5.

Imbalance of the time window will occur on both sides of the correlation values as the multiplexing number increases, as is described in the prior art with reference to FIG. 5.

If multiplexing is not conducted, the correlation values on both sides would be 1 with respect to a central value 11, which are symmetric thereto. If multiplexing is conducted, the values on both sides become non-symmetric. If multiplexing of 5 signals is conducted, adjacent correlation spikes are spaced by only 2 chips. Accordingly, if the time window is widened by an amount corresponding to 7 clock cycles, that is, 1.5 chips on both sides, the outermost spikes would be influenced by adjacent correlation spikes.

Therefore, it is better to narrow the time window to some extent when the multiplexing number is larger. The characteristics can be enhanced by controlling the time window depending upon the multiplexing number and/or delay amount in the control unit.

Figure 2:
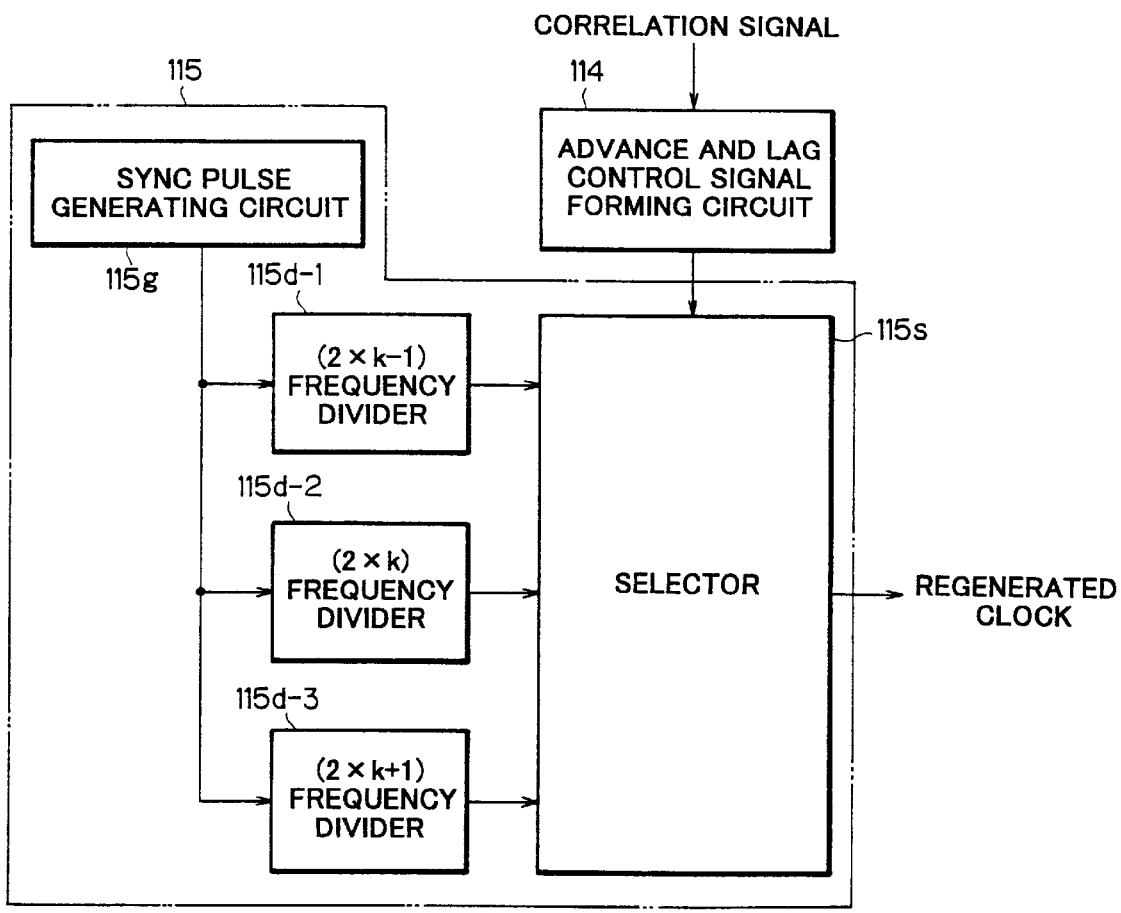
FIG. 2 is a circuit block diagram exemplarily illustrating a prior art clock regenerating circuit and for showing a clock regenerating unit in more detail.
Figure 4B:
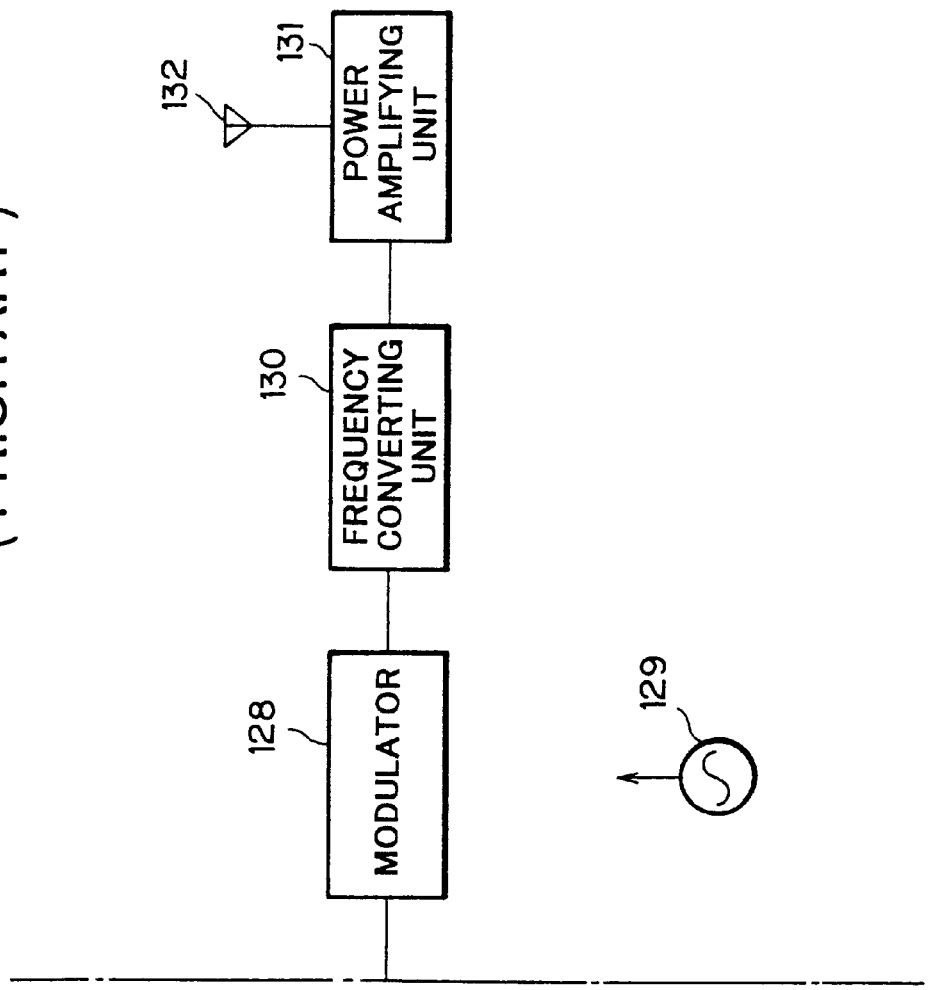

The foregoing embodiment which has been described has been developed from the basic configuration which has been exemplarily shown in FIGS. 1 to 3 as prior art which was invented by the inventor of the present application.

If the output from each of the comparators which are disclosed in the prior art (specification of Japanese Laid-Open Patent Publication (TOKKAIHEI) No. 8-316875) is weighted by a weighting circuit, added by an adder 1, or weighted and added by a combination of both circuits and values of weights, and if overflow values of adders are controlled in response to control signals from an external controller, a similar advantage would be obtained. Universality of the present invention will not be lost.

Figure 8:
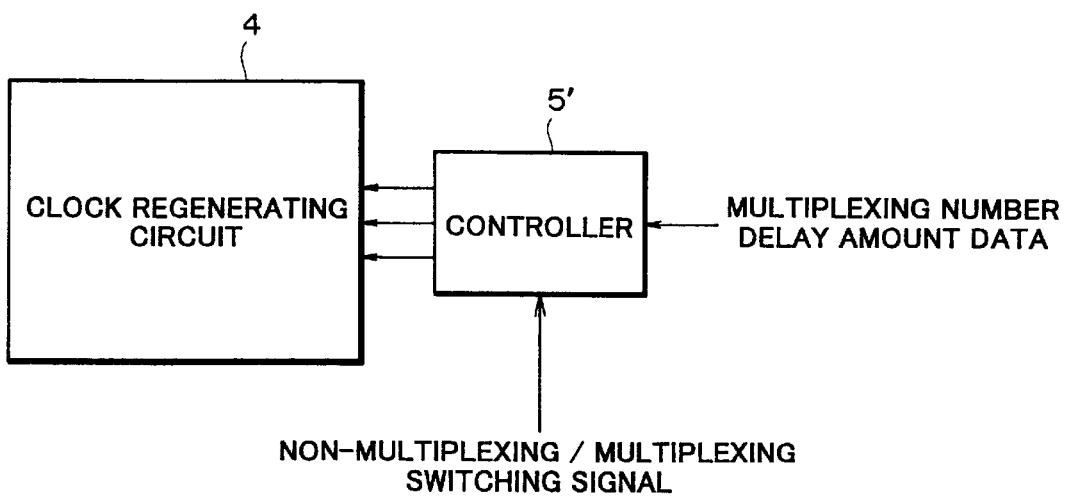
FIG. 8 is a circuit diagram showing another circuit including a controller in the embodiment of the clock regenerating circuit of the present invention.

Another embodiment will be described with reference to FIG. 8. A system in which non (single)-multiplexing/multiplexing is conducted in Japanese Laid-Open Patent Publication (TOKKAIHEI) No. 9-298491, the inventor of which is identical to the present inventor of the present application is disclosed. The present invention is also applicable to this configuration. An exemplary embodiment will be described.

The embodiment is configured in such a manner that a signal for switching non-multiplexing/multiplexing is externally input to a controller 5 which is relevant to the controller 5 of the clock regenerating circuit 4 shown in FIG. 7. In the above-mentioned non-multiplexing/multiplexing system, a non-multiplexed signal is necessarily received. Therefore, the threshold values of the comparators, overflow values of the adders, the time window of the time window control unit 16, and weighting of the weighting circuit are initially preset for non-multiplexing.

Since the signals are transmitted in the form of packets in a packet communication, it is necessary to establish the bit synchronization, frame synchronization, etc. At this end, the control signals are initially preset to optimal values for non-multiplexing in the clock regenerating circuit so that the receiver is in a reception standby mode.

The receiver can receive the signals using optimal characteristics by determining from a received signal that the transmitting station initiated transmission for starting reception. The threshold values, overflow values of the adder, time window and the weights which are preset at a field which is changed to the multiplexed field are changed depending upon the multiplexing number/delay amount. These values can be matched with the preset values since the multiplexing number and the delay amount per se are contained in the data of the non-multiplexed field or preliminarily determined.

The timing of switching from the non-multiplexing to multiplexing will be described. There are three possible approaches.

Now, a first approach will be described. In a case in which a data format is fixed in a communication data format, the number of bits from the frame sync field to a start of multiplexed field in a data format which is a reference for extracting timing is pre scribed. Non-multiplexing mode can be switched to multiplexing mode by counting the switching timing with reference to sync signals of the frame sync field.

Now, a second approach will be described. In this approach, the format of the non-multiplexed field is not fixed, but variable. The length of the non-multiplexed field is provided in the data of the non-multiplexed field. Thus, non-multiplexing mode can be switched to multiplex mode by counting the switching timing with reference to the length of the variable length portion which is obtained from demodulated data in the non-multiplexed field.

Now, a third approach will be described. A system like the present invention is often controlled by an upper layer (MAC) in a packet communication system. In this case, switching of transmission/reception, CRC check and control of retransmission is achieved by a control from the upper layer. Therefore, if this control method is used for the system having such a configuration, control of switching can also be conducted by the upper layer.

Hence, a wireless unit which is relevant to the physical layer has a control terminal as an external interface so that switching can be achieved depending upon the timing of the external control signal. The wireless unit controls switching between non-multiplexing and multiplexing modes in response to information from the upper layer. This approach is different from the first and second approaches in that control is conducted in the physical layer in the third approach, while control is conducted in a system in which the upper layer is not clear, or a physical layer even if an upper layer is provided.

Figure 9:
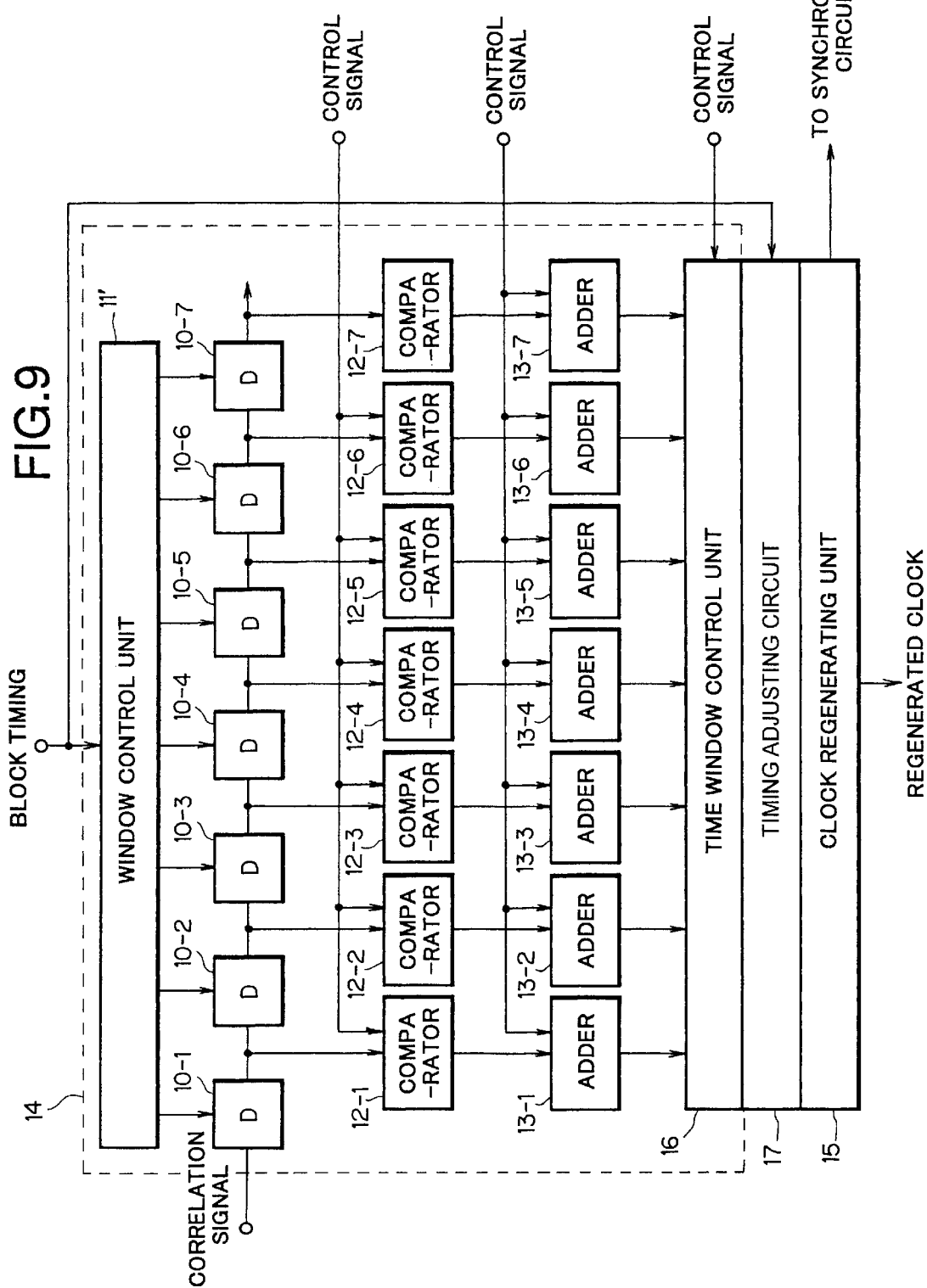
FIG. 9 is a circuit block diagram showing another embodiment of the clock regenerating circuit of the present invention in the spread spectrum communication.

A further embodiment will be described with reference to FIG. 9.

In the first embodiment which has been described with reference to FIG. 6, clock regeneration in the clock regenerating circuit is conducted based upon the output of correlation signal for each data timing. However, transmission rate of data changes before and after the transition between the non-multiplexed and multiplexed fields in a data format having a non-multiplexed and multiplexed fields like the above-mentioned embodiment. In a system using a multiplexing number of 5, the transmission rate of data is 5 times. Accordingly, if the clock regenerating circuit is controlled based upon data, the rate of determination becomes 5 times.

Considering the clock offset shows that the offset of the clock signals between the receiver and transmitter uniquely depends upon the accuracy of the quartz crystal oscillator. It is considered that making the determination rate equal before and after the switching of multiplexing can be implemented by using block timing in lieu of data timing.

Since a signal representing such a block in the multiplexed field generated in the receiving system, clock regeneration can be conducted at the same tracking rate before and after the multiplexing switching. The circuit shown in FIG. 9 is substantially identical in structure with that in FIG. 6 except that the block timing is used in lieu of the data timing.

A further embodiment will be described.

In the embodiment having the above-mentioned clock regenerating circuit, clock regeneration is conducted by changing the frequency conversion ratio in response to a signal which is generated on overflow of the adder, etc. in an advance and lag control signal forming circuit (refer to 114 in FIGS. 1 and 2).

In this embodiment, there is provided means for selecting the timing of changing the frequency conversion ratio of the clock which is generated in response to an advance and lag control signal of the clock. The embodiment has a feature that the frequency conversion ratio is changed where the delay multiplex period of time of the multiplexed signals is most extended.

Figure 10:
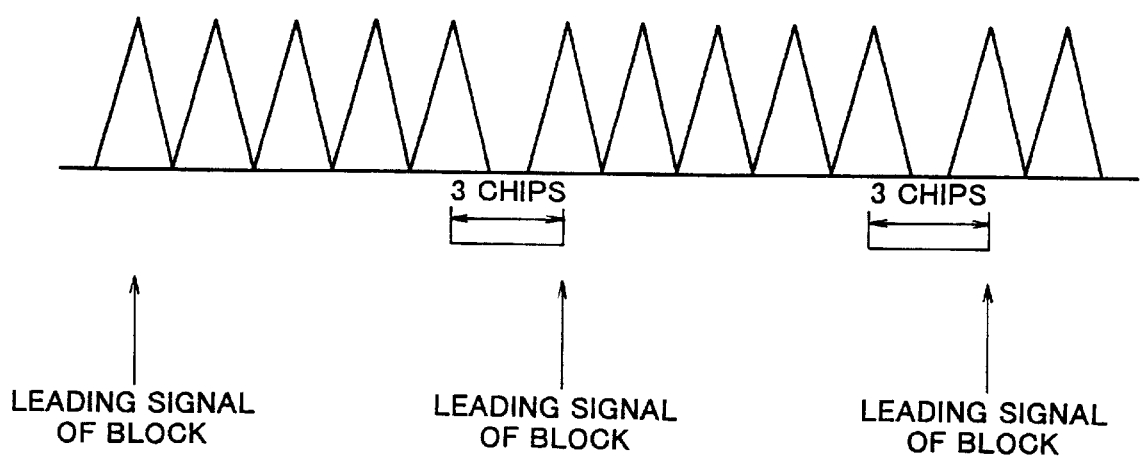
FIG. 10 is a schematic view of correlation outputs, which is used for explaining the timing of control operation of the clock regenerating circuit of the present invention.

This embodiment is shown in FIG. 10, which is a schematic view illustrating a model in which multiplexing of 5 signals is conducted for a spread code of 11 chips. Since the delay time are 2, 2, 2, 2 and 3 chips, the frequency conversion ratio is changed in a position corresponding to 3 chips position where the delay time interval is longest.

A manner of this control which is conducted in two states is illustrated in FIG. 11.

FIG. 11A shows that the control of the samples of the correlation output, which are spaced by three samples, is conducted so that the samples are advanced and lagged. FIG. 11B shows that the control of the samples of the correlation output, which are spaced by 2 chips, is conducted so that the samples are advanced or lagged. In both cases, one chip comprises two samples.

Advancing and lagging of the samples causes the space to be 2.5 and 3.5 chips, respectively in the case in which the samples are spaced by 3 chips, as shown in FIG. 11A. No problem will occur since the samples of the correlation outputs do not overlap each other.

On the other hand, advancing and lagging of the samples causes the space to be 2.5 and 3.5 chips, respectively, in the case in which the samples are spaced by three chips as shown in FIG. 11B. No problem occurs when the samples are lagged. If the samples are advanced, the adjacent correlation output signals overlap each other when the space is 1.5 chips, as shown in FIG. 11B, so that there is a likelihood that the characteristics of the demodulation and the correlation synchronization circuit will be adversely influenced.

If an actual demodulating circuit is considered, for example, the time duration of one chip is assumed to be 50 ns, the demodulating unit requires to have only an operation processing capability of 100 ns, since the usual minimum demodulating period of time is two chips.

However, if the clock is adjusted in the position of 2 chips, the minimum demodulation period of time would be that corresponding to 1.5 chips (75 ns), so that the maximum operation time of the system is 75 ns.

In contrast to this, if the clock is adjusted in the position of three chips, the minimum demodulation period of time is 125 ns, corresponding to 2.5 chips. The maximum operation time may be 100 ns.

Figure 12:
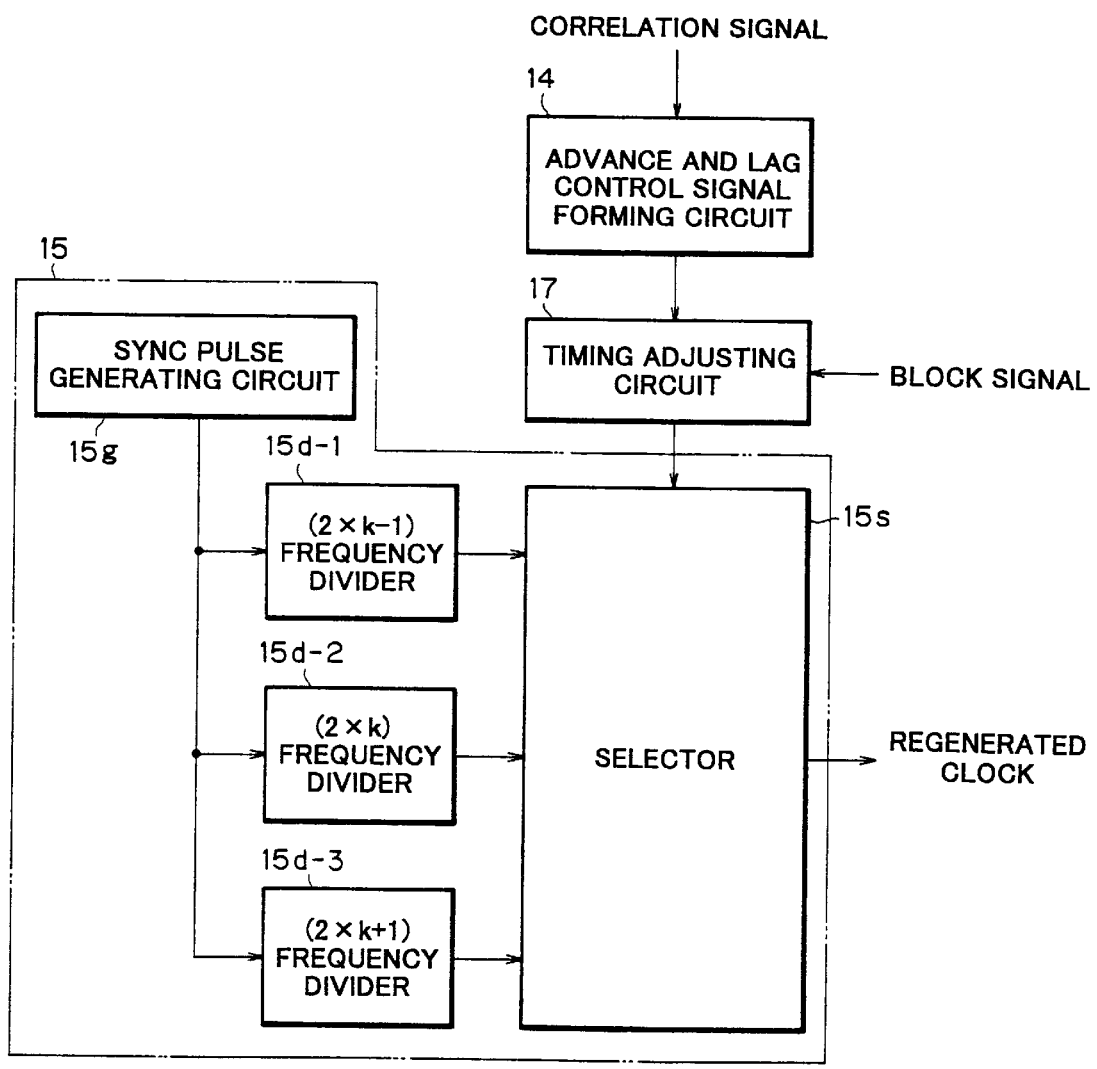
FIG. 12 is a circuit block diagram showing a further embodiment of the clock regenerating circuit of the present invention in the spread spectrum communication.

An example of a circuit for implementing this method is shown in FIG. 12.

In FIG. 12, after the timing of an advance and lag control signal which is input to a clock regenerating unit 15 is adjusted by an adjusting circuit 17, the control signal is fed to the clock regenerating unit 15. The clock regenerating unit 15 is identical with that of the prior art of FIG. 2. The advance and lag control signal forming circuit 14 may be the above-mentioned identical circuit of the present invention. The timing of the clock is adjusted in synchronization with the timing in which the block signal is obtained. Since only one block timing signal is generated with respect to the multiplexed portion, this signal is used as a reference for the timing.

In FIG. 10, the leading signal of a block is in synchronization with the maximum chip space. The timing of the block is required to adjust with reference to this timing relationship. If the timing of the leading signal of the block is different from that of the maximum chip interval, the difference in timing is already known. Adjusting can be conducted by taking this difference into consideration.

Timing adjustment at the maximum chip space in such a manner enables stable synchronization and demodulation to be conducted, and allows the maximum operation speed to have a margin.

Figure 13:
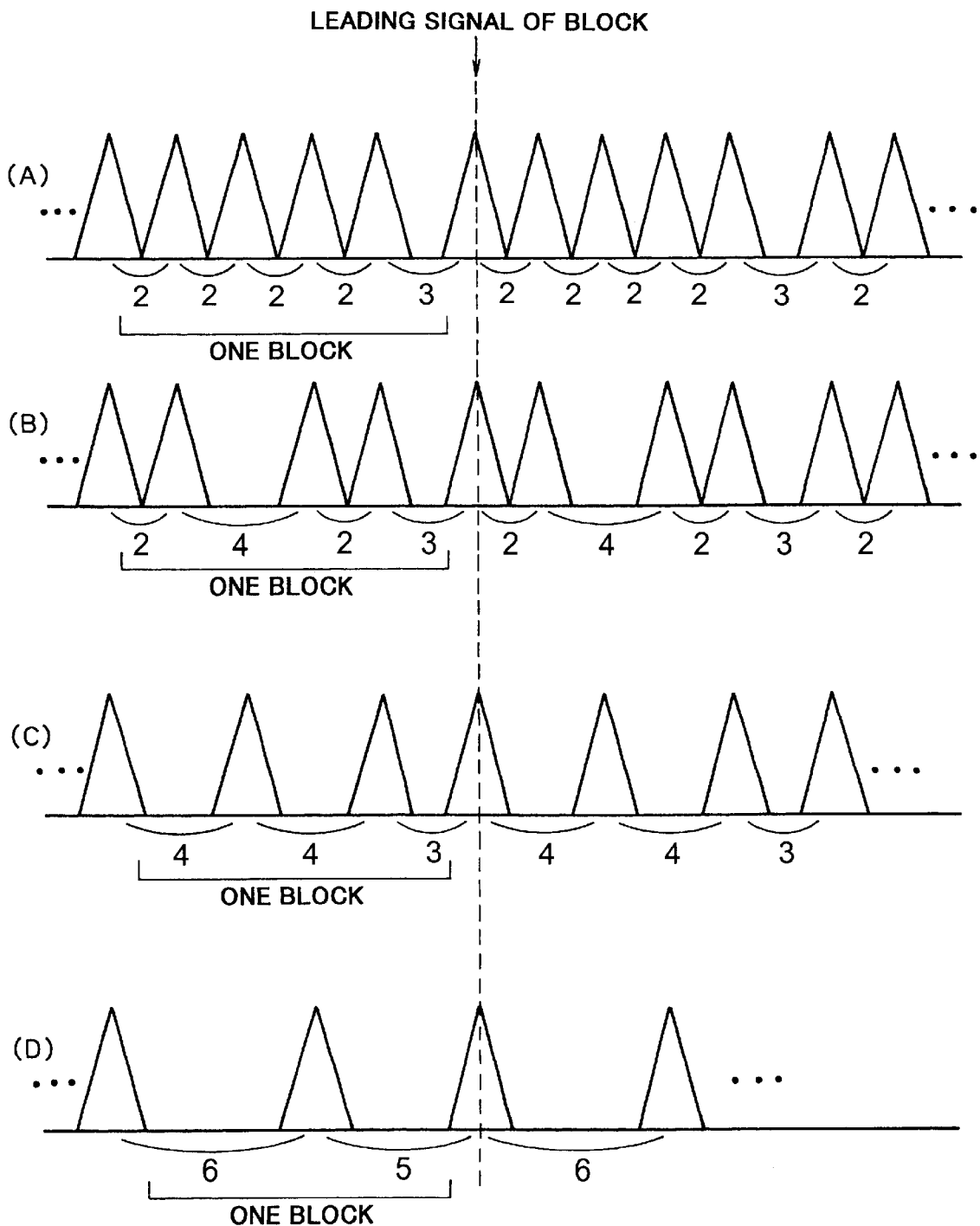
FIG. 13 is a schematic view of correlation outputs, which is used for explaining the operation of the clock regenerating circuit of the present invention in a multiplexing number variable system.

A further embodiment will be described. In this embodiment, adjustment of the clock is performed in a period of time when the space between chips is largest. However, the position in which the space between chips is largest changes with the multiplexing number in a multiplexing number variable system. This example will be described with reference to FIG. 13. Correlation signal outputs are shown in FIG. 13. Parts (A), (B), (C) and (D) of FIG. 13 show multiplexing of 5, 4, 3 and 2 signals, respectively.

Since the chips are spaced by 2, 2, 2, 2 and 3 as mentioned above in the case of multiplexing 5 signals, it is most appropriate to perform adjustment when the chips are spaced by 3. On the other hand, the chips are, at most, spaced by 4 when multiplexing 4 and 3 signals.

However, considering a practical system, the minimum space between chips is 2 in the case of multiplexing 5 signals. Accordingly, a receiving circuit is preset so that it sufficiently operates at this rate. It is not necessary to perform adjustment where the chips are spaced by 4 chips.

On the other hand, three chip spacing is not largest in a system of multiplexing 4 and 3 signals. By presetting so that the clock is adjusted where the chips are spaced by 3 chips, which is largest in multiplexing 5 signals, switching is enabled in the same switching timing (leading signal of each block) resulting in simplified control.

Accordingly, timing of the clock adjustment is switched with reference to the maximum delay amount when the multiplexing number is largest (3 chips for multiplexing 5 signals, in this example). Switching is performed in the same timing, even if the multiplexing number is less.

In this case, switching can be performed with reference to the block signal shown in FIG. 12. As a result of this, it is not necessary to change the switching timing relative to the block signal timing for each multiplexing number. Switching can always be performed in the same timing for the block signal, resulting in a simplified circuit.

A further embodiment will be described.

A circuit for improving a correlation output of a multiplexed signal is disclosed in Japanese Laid-Open Patent Publication (TOKKAIHEI) No. 9-270735 which was filed by the inventor of the present application.

As mentioned above, there is a problem that the correlation output varies between 7, 9, 11, 13 and 15, when 5 signals are multiplexed.

This will invite deterioration in the error rate when the data is demodulated. Thus, the invention of Japanese Laid-Open Patent Publication (TOKKAIHEI) No. 9-270735 aims at always keeping the correlation output used for demodulation at a constant value (for example, 10.5).

Hence, also in clock regeneration, deterioration in error rate is prevented by using the correlation output which is obtained from this correlation output improving circuit.

Since the correlation output varies due to multiplexing in the foregoing embodiment, another embodiment was described in which the time window, weight and threshold, etc to be preset is changed for each multiplexing number used in the clock regenerating circuit.

In the clock regenerating circuit, the clock holding characteristics can be improved by using the correlation output value which is obtained after the improvement of the correlation output. Since the delay amount is 2, 2, 2, 2 and 3, even if the signal is passed through the correlation output improving circuit, control of the time window, etc is in part necessary. Presetting of the threshold value and weight, etc can be simplified, and performance can be enhanced.

An exemplary configuration of the circuit which can perform this operation is shown in FIG. 14.

In FIG. 14, the correlation output from the correlator 1 is improved by a correlation output improving circuit 3 which is used as an input to the clock regenerating circuit 4, and as a correlation signal input to a modulator.

The correlation output improving circuit 3 will not become operative until correlation synchronization is established. Since it is operated also in the clock regenerating circuit 4 after the correlation synchronization. The correlation output after the improvement can be used for the clock regeneration.

Accordingly, this output is used to perform the clock regeneration. The manner of regeneration is identical with those in the prior art and the foregoing embodiments of the present invention. Since the timing of the correlation output may be shifted by several clock signals due to passing through the correlation output improving circuit 3, it is only necessary to compensate for the shifted time.

According to the present invention, the following advantageous effects would result:

(1) It is possible to operate the clock regenerating circuit under optimal conditions by choosing the preset time window, weight and threshold value.

When a signal which is directly spread with a spread code is used in a system which is capable of multiplexing plural series of signals, each of which is delayed by several chips particularly, a time window, weight and threshold value which are optimal for the multiplexing number can be selected by changing them depending upon the multiplexing number of the multiplexing system, and the delay time which is used for multiplexing.

(2) In addition to the effect relevant to (1) above, the circuits can be automatically preset to respective optimal conditions in response to received signals if the transmission signal is transmitted in a scheme having a non-multiplexed field. The circuits can be optimally and quickly preset, even in a non-multiplexed and multiplexed fields, by automatically changing the time window, weight and threshold, which are preset by said clock regenerating circuit between the non-multiplexed field and multiplexed field, depending upon its format.

At this time, in a fixed data format, the presetting switching between the non-multiplexed field and multiplexed field is conducted depending upon the timing in accordance with the intended data format and in a variable length data format. Switching timing is generated in accordance with the data in the demodulated received signal, and presetting switching is conducted in accordance with its switching timing.

Since the presetting switching is conducted in response to an external signal, adaptation to a packet communication system which is controlled by an upper layer can be achieved.

(3) If the signal which is directly spread with a spread code is used in a system in which plural series of spread signals, each of which is optimally delayed by several chips and which can be multiplexed, clock regeneration can be controlled at the same rate, irrespective of the multiplexing number in the clock regenerating circuit by regenerating a clock based upon only the leading signal of the multiplexed block also in the multiplexed field.

(4) The signal which is directly spread with a spread code is used in a system plural series of spread signals, each of which is optimally delayed by several chips and which can be multiplexed, clock regeneration can be conducted without overlapping of the correlation outputs, and decreasing the minimum demodulating space by switching the timing of the clock regeneration where the preset delay time is longest in the case in which the preset delay time is nonuniform.

Demodulation can be conducted in the same timing, even if the multiplexing number is changed, by conducting switching with reference to the time when the presettable multiplexing number is largest, and where the preset delay time is longest when the multiplexing number is largest, and also in said preset timing even if the multiplexing number is less.

(5) If the signal which is spread with a spread code is used in a system in which plural series of signals, each of which is delayed by several optional chips can be multiplexed, stable clock regeneration can be conducted by using a correlation signal output which is subjected to an improvement processing by autocorrelation as a signal to be compared with a threshold value in the clock regeneration circuit.

What is claimed is:

1. A clock regenerating circuit in direct spread spectrum communication system for regenerating a sampling clock signal for sampling a spread signal which is directly spread with a spread code so that a predetermined number of samples are sampled per one chip, including:

means for dividing a frequency of the sampling clock signal to output a variable clock signal responsive to a control signal and having a different frequency from a clock which is in synchronization with a demodulation and correlation synchronizing pulse;

a plurality of comparators, each providing a comparison result from comparing at least one predetermined threshold value with one of an associated plurality of differently delayed correlation signals obtained by conducting a correlation processing of said spread signal which is sampled according to said sampling clock signal;

a window control unit for controlling presentation of the plurality of differently delayed correlation signals to the associated plurality of comparators;

means for forming an advance/lag control signal by determining whether a timing of said sampled spread signal is advanced or lagged based upon each of the comparison results of said plurality of comparators, wherein the variable clock signal is output by using an advance and lag control signal from said advance/lag control signal forming means as a control signal for said sampling clock signal frequency dividing means;

a plurality of adders each having a variable overflow value; and time window presetting means for presetting a time window for each output of said plurality of comparators responsive to at least one output of said plurality of adders, wherein said at least one predetermined threshold value in each of said plurality of comparators, said variable overflow value, and the time window in said time window presetting means are each separately variable.

2. A clock regenerating circuit in a direct spread spectrum communication system for regenerating a sampling clock signal for sampling a spread signal which is directly spread with a spread code so that a predetermined number of samples are sampled per chip, comprising:

means for dividing a frequency of the sampling clock signal to output a variable clock signal responsive to a control signal and having a different frequency from a clock which is in synchronization with a demodulation and correlation synchronizing pulse;

a plurality of comparators, each providing a comparison result from comparing at least one predetermined threshold value with one of an associated plurality of differently delayed correlation signals obtained by conducting a correlation processing of said spread signal which is sampled according to said sampling clock signal; and means for forming an advance/lag control signal by determining whether a timing of said sampled spread signal is advanced or lagged based upon each of the comparison results of said plurality of comparators, wherein the variable clock signal is output by using an advance and lag control signal from said advance/lag control signal forming means as a control signal for said sampling clock signal frequency dividing means; and time window presetting means for presetting a time window for each output of said plurality of comparators, wherein said at least one predetermined threshold value in each of said plurality of comparators and the time window in said time window presetting means are each separately variable, wherein when being used in a multiplexing system in which a multiplexed plurality of signals are each directly spread with a spread code and delayed by an optional one or more chips, said at least one predetermined threshold value in each of said plurality of comparators and said time window are determined by a multiplexing number and a delay time of the multiplexing system.

3. The clock regenerating circuit as defined in claim 2, wherein when said multiplex system is operated in accordance with a scheme in which a transmission signal has a non-multiplexed field and a multiplexed field, said clock regenerating circuit includes means for changing said at least one predetermined threshold value in each of said plurality of comparators and said time window at a transition between said non-multiplexed field and said multiplexed field.

4. The clock regenerating circuit as defined in claim 3, wherein said changing means operates in accordance with an intended data format of said transmission signal.

5. The clock regenerating circuit as defined in claim 3, wherein said changing means operates in accordance with a changing timing data obtained from a signal demodulated from said transmission signal.

6. The clock regenerating circuit as defined in claim 3, wherein said changing means operates in response to an external signal.

7. A clock regenerating circuit in direct spread spectrum communication system for regenerating a sampling clock signal for sampling a spread signal which is directly spread with a spread code so that a predetermined number of samples are sampled per one chip, including:

means for dividing a frequency of the sampling clock signal to output a variable clock signal responsive to a control signal and having a different frequency from a clock which is in synchronization with a demodulation and correlation synchronizing pulse;

a plurality of comparators, each providing a comparison result from comparing at least one predetermined threshold value with one of an associated plurality of differently delayed correlation signals obtained by conducting a correlation processing of said spread signal which is sampled according to said sampling clock signal; and means for forming an advance/lag control signal by determining whether a timing of said sampled spread signal is advanced or lagged based upon each of the comparison results of said plurality of comparators, wherein the variable clock is output by using an advance and lag control signal from said advance/lag control signal forming means as a control signal for said sampling clock signal frequency dividing means; and wherein when being used in a multiplexing system in which a multiplexed plurality of signals are each directly spread with a spread code and delayed by an optional one or more chips, the clock regenerating circuit further includes a timing adjustment circuit which adjusts the control signal based on a leading block signal of a multiplexed block in a multiplexed field.

8. A clock regenerating circuit in direct spread spectrum communication system for regenerating a sampling clock signal for sampling a spread signal which is directly spread with a spread code so that a predetermined number of samples are sampled per one chip, including:

means for dividing a frequency of the sampling clock signal to output a variable clock signal responsive to a control signal and having a different frequency from a clock which is in synchronization with a demodulation and correlation synchronizing pulse;

a plurality of comparators, each providing a comparison result from comparing at least one predetermined threshold value with one of an associated plurality of differently delaved correlation signals obtained by conducting a correlation processing of said spread signal which is sampled according to said sampling clock signal; and means for forming an advance/lag control signal by determining whether a timing of said sampled spread signal is advanced or lagged based upon each of the comparison results of said plurality of comparators, wherein the variable clock signal is output by using an advance and lag control signal from said advance/lag control signal forming means as a control signal for said sampling clock signal frequency dividing means; and wherein when being used in a multiplexing system in which a multiplexed plurality of signals are each directly spread with a spread code and delayed by an optional one or more chips, and wherein a plurality of preset delay time intervals between said comparison results of said plurality of comparators are non-uniform, operational timing of the regenerated clock signal with respect to said variable clock signal is synchronized by a longest delay time interval of said plurality of preset delay time intervals.

9. The clock regenerating circuit as defined in claim 8, wherein regeneration of the sampling clock signal is performed using a maximum presettable multiplex number for the multiplexing system, so that regeneration of the sampling clock signal is also performed where a multiplex number is less than the maximum presettable multiplex number.

\* \* \* \* \*